US010086358B2

(12) United States Patent
Araki et al.

(10) Patent No.: US 10,086,358 B2
(45) Date of Patent: Oct. 2, 2018

(54) PROCESS FOR OBTAINING NANOCOMPOSITES, NANOCOMPOSITE, METHOD OF CAPTURE AND RETRIEVAL OF A SOLUBILIZED AND/OR DISPERSED MATERIAL IN ORGANIC OR INORGANIC MEDIUM, METHOD OF PURIFICATION OF AN ORGANIC OR INORGANIC MEDIUM AND CAPTURE AND RETRIEVAL KIT FOR A SOLUBILIZED AND/OR DISPERSED MATERIAL IN ORGANIC OR INORGANIC MEDIUM

(71) Applicants: PETROLEO BRASILEIRO S.A. - PETROBRAS, Rio de Janeiro, RJ (BR); Universidade de Sao Paulo-USP, Sao Paulo, SP (BR)

(72) Inventors: Koiti Araki, Pinus Park Cotia (BR); Ulisses Condomitti Epamino, Sao Paulo (BR); Alceu Totti Silveira Junior, Sao Paulo (BR); Sergio Hiroshi Toma, Sao Paulo (BR); Henrique Eisi Toma, Sao Paulo (BR)

(73) Assignees: PETROLEO BRASILEIRO S.A.-PETROBRAS, Rio de Janeiro (BR); Universidade de Sao Paulo-USP, Sao Paulo (BR)

( * ) Notice: Subject to any disclaimer, the term of this patent is extended or adjusted under 35 U.S.C. 154(b) by 483 days.

(21) Appl. No.: 14/737,045

(22) Filed: Jun. 11, 2015

(65) Prior Publication Data
US 2015/0367324 A1 Dec. 24, 2015

(30) Foreign Application Priority Data
Jun. 20, 2014 (BR) .......................... 102014015139

(51) Int. Cl.
*B01J 20/20* (2006.01)
*B03C 1/01* (2006.01)
(Continued)

(52) U.S. Cl.
CPC ........ *B01J 20/205* (2013.01); *B01D 15/3885* (2013.01); *B01J 20/06* (2013.01);
(Continued)

(58) Field of Classification Search
CPC .. B01J 20/205; B01J 20/28016; B01J 20/305; B01J 20/28009; B01J 20/06; B03C 1/01;
(Continued)

(56) References Cited

U.S. PATENT DOCUMENTS

2006/0286379 A1* 12/2006 Gao ..................... C09C 1/24
428/403
2011/0124492 A1* 5/2011 Loukine ............... B01J 35/0013
502/159
(Continued)

FOREIGN PATENT DOCUMENTS

CN 101940910 A 1/2011
CN 102527332 A 7/2012
(Continued)

OTHER PUBLICATIONS

A Facile Synthesis of Fe3O4 charcoal composite MdJK Ahmed M Ahmaruzzaman/ Journal of Environmental Management 163 (Aug. 28, 2015) 163-173.*
(Continued)

*Primary Examiner* — Pamela H Weiss
(74) *Attorney, Agent, or Firm* — Sughrue Mion, PLLC

(57) ABSTRACT

The present invention lies in the fields of chemistry and nanotechnology and describes a nanocomposite to be used in the recovery of several compounds from inorganic or organic medium. Specifically, the invention presents a nano-
(Continued)

composite consisting of magnetic nanoparticles composed of $Fe_3O_4$ associated to an activated charcoal adsorbent substrate, a process to obtain and methods of use of the nanocomposite. The present invention enables the processing, concentration and recovery of large volumes of contaminated water, regenerating magnetic adsorbent material for reuse, in a cyclic and sustainable manner, transforming dispersed/diluted pollutants in pre-concentrates that can be easily processed, helping to conserve natural resources.

3 Claims, 6 Drawing Sheets

(51) Int. Cl.
| | | |
|---|---|---|
| *B01J 20/06* | (2006.01) | |
| *B01J 20/28* | (2006.01) | |
| *B01J 20/30* | (2006.01) | |
| *B01D 15/38* | (2006.01) | |
| *C02F 1/28* | (2006.01) | |
| *C02F 101/30* | (2006.01) | |
| *C02F 103/30* | (2006.01) | |
| *C02F 103/28* | (2006.01) | |
| *C02F 101/20* | (2006.01) | |
| *C02F 103/36* | (2006.01) | |
| *C02F 1/48* | (2006.01) | |

(52) U.S. Cl.
CPC ... *B01J 20/28009* (2013.01); *B01J 20/28016* (2013.01); *B01J 20/305* (2013.01); *B03C 1/01* (2013.01); *C02F 1/288* (2013.01); *C02F 1/283* (2013.01); *C02F 1/488* (2013.01); *C02F 2101/20* (2013.01); *C02F 2101/305* (2013.01); *C02F 2101/306* (2013.01); *C02F 2101/308* (2013.01); *C02F 2103/28* (2013.01); *C02F 2103/30* (2013.01); *C02F 2103/365* (2013.01); *C02F 2305/08* (2013.01)

(58) Field of Classification Search
CPC ...... C02F 1/288; C02F 1/488; C02F 2305/08; C02F 2103/28; C02F 2101/308; C02F 2103/30; C02F 2101/305; C02F 1/283; C02F 2103/365; C02F 2101/306; C02F 2101/20; B01D 15/3885
See application file for complete search history.

(56) References Cited

U.S. PATENT DOCUMENTS

| | | | |
|---|---|---|---|
| 2012/0141602 A1* | 6/2012 | Escolano | C08F 2/44 424/647 |
| 2012/0186980 A1 | 7/2012 | Ramaprabhu et al. | |
| 2016/0243523 A1* | 8/2016 | Saini | B01J 20/06 |

FOREIGN PATENT DOCUMENTS

| | | | |
|---|---|---|---|
| WO | 2012/099445 A2 | 7/2012 | |
| WO | WO 2015044964 A1 * | 4/2015 | B01J 20/06 |

OTHER PUBLICATIONS

Alkyl Phosphonate/Phosphate coating on Magnetite nanoparticles Langmuir (2001) 17 pp. 7907-7911.*
"Hitchhiker's Guide to Magnetism" by Bruce Moskowitz available online Jun. 26, 2002.*
"Morphology and Magnetic Properties of Fe3O4-Alginic Acid Nanocomposites" M Kazmierczak, K Pogorzelec-Glaser, A Hilczer, S Jurga, L Majchrzycki, M Nowick, R Czajka, F Matelski, R Pankiewicz, B Leska, L Kepinski and B Andrzejewski (2013) https://arxiv.org/ftp/arxiv/papers/1309/1309.7216.pdf.*
Wang J, Meng G, Tao K, Feng M, Zhao X, et al. (2012) Immobilization of Lipases on Alkyl Silane Modified Magnetic Nanoparticles: Effect of Alkyl Chain Length on Enzyme Activity. PLoS ONE 7(8): e43478. doi:10.1371/journal.pone.0043478.*
A FAcile Synthesis of Fe3O4 charcoal composite MdjK Ahmed Ahmaruzzaman/Journal of Environmental Management 163 (Aug. 28, 2015) 163-173.*

* cited by examiner

PROCESS FOR OBTAINING NANOCOMPOSITES, NANOCOMPOSITE, METHOD OF CAPTURE AND RETRIEVAL OF A SOLUBILIZED AND/OR DISPERSED MATERIAL IN ORGANIC OR INORGANIC MEDIUM, METHOD OF PURIFICATION OF AN ORGANIC OR INORGANIC MEDIUM AND CAPTURE AND RETRIEVAL KIT FOR A SOLUBILIZED AND/OR DISPERSED MATERIAL IN ORGANIC OR INORGANIC MEDIUM

CROSS REFERENCE TO RELATED APPLICATIONS

This is a non-provisional application claiming priority based on Brazilian Patent Application No. 10 2014 015139-7 filed in Brazil on Jun. 20, 2014, the contents of which are incorporated herein by reference in their entirety.

BACKGROUND OF THE INVENTION

The present invention describes a nanocomposite to be used in the recovery of several compounds from inorganic or organic medium. Specifically, the invention presents a nanocomposite consisting of magnetic nanoparticles composed of $Fe_3O_4$ associated with an activated charcoal adsorbent substrate, a process to obtain and methods of use of the nanocomposite. The present invention lies in the fields of chemistry and nanotechnology.

BACKGROUND OF THE INVENTION

Pollution is characterized by the dispersion of low concentrations of compounds and harmful substances in the environment, whose treatment of high volumes is hampered both by the technical and economic point of view, particularly when they are solubilized in the medium (molecular level dispersion). For example, the amount of minerals containing noble metals concentrates is becoming increasingly scarce due to its spread in the environment due to their applications both in industry and in mass consumer products. Thus, it becomes increasingly necessary the development of materials and processes that allow for the concentration and recovery of elements dispersed in even smaller quantities, currently on the pollutant level, e.g. in water bodies.

Currently, costly processes are used for removing contaminants from water, particularly when it comes to soluble species that do not readily precipitate or are removed by oxidation or by means of conventional treatments. These processes involve steps such as pH correction, flocculation and subsequent removal of the resulting flocculated material, generating potentially toxic waste (and often transferring the problem of water pollution to another form of tailings, e.g. solid waste), making use of slow processes of sedimentation, sand filtration, and/or the use of expensive filter elements with limited lifespan. Thereat, they can be subjected to treatments with oxidants such as chlorine, ozone or hydrogen peroxide to remove pathogens and eventually, soluble species. However, metal ions and other contaminants may still remain after all treatments, keeping the water inadequate for drinking or discarding. Still, conventional treatments often leave large volumes of contaminated solid waste, like sludge, requiring the correct disposal of that waste in landfills, suitable storage locations or incineration.

The anteriority search revealed some relevant documents that will be described below.

Document CN102527332 reveals a magnetic compound adsorption material, and the preparation and implementation processes. The magnetic adsorbent composite material, comprising pulverized activated charcoal particles and nanometric iron oxide mixed on the surface or internal parts of micrometric particles. The material is useful for the sewage treatment by means of magnetic separation. The activated carbon particles and nanometric $Fe_3O_4$ mass ratio in the magnetic adsorbent composite material is 4:1 to 5:3, and the size of the magnetic adsorbent composite material is 100 micra to 1 mm. The composite material described in the document differs from the current due to the fact that this one is characterized by the use of 4 to 10 nm nanoparticles deposited preferentially on the surface of the activated charcoal.

The document WO2012099445 reveals a porous adsorbent which is impregnated with magnetite, ferrihydrite, goethite or Hematite. The porous adsorbent is the activated charcoal, zeolite or pulverized alumina. The said document also details the porous adsorbent manufacturing, which involves immersing the porous adsorbent in a liquid phase which includes magnetite, ferrihydrite, goethite or hematite, porous adsorbent exposure to alkaline solution to form pores in the sedimentation, heating, washing and drying phases. Also details the water treatment method that uses the porous adsorbent. Among the compounds removed from water are natural organic matter, calcium and sodium ions.

The document details the CN101940910 composite material for adsorption of the magnetic separation type that comprises nanometer iron oxide ($Fe_3O_4$) and active carbon fiber. The synthesized composite material can be used as adsorbent material of the magnetic separation type to adsorb organic and inorganic pollutants to purify waste water. The present invention differs from this document since it does not use substrate from carbon fiber based on polyacrylonitrile and a unique production process.

The US20120186980 document details a device comprising a capacitor which includes a porous nanometric structure and metal oxide nanoparticles arranged over the nanometric porous structure. The preferred metal oxide is the ferric oxide and the preferred porous nanometric structure are the carbon nanotubes. The device can be used to separate ions of a fluid to remove arsenate, arsenite and sodium from the water. The present invention differs from this document due to the fact that it does not use carbon nanotubes as the porous medium and the objective of the US20120186980 is a device for removing the water ions.

Thus, it may be observed as per the above detailed that there a necessity of new adsorbent materials which can be produced in greater quantity and in a simplified way that will reduce the production costs. Additionally, it may be observed the necessity of improved adsorbent materials that can be separated from the medium where they are scattered in a simplified way, allowing the regeneration in order to make its reuse possible. This will increase the efficiency in the applications of the adsorbent material.

As per the literature available, it was not found documents anticipating or suggesting the teachings of the present invention, so the solution proposed here has novelty and inventive steps according to the prior art.

SUMMARY OF THE INVENTION

The technology presented in this document differs significantly from others existing since it enables the processing of large volumes of contaminated water and allows the concentration and recovery of them, regenerating the magnetic adsorbent material for reuse in a cyclic and sustainable manner, transforming the dispersed/diluted pollutants in pre-concentrated that can be easily managed, helping to conserve natural resources. To do that, magnetic nanomaterials have been developed with unique properties of inorganic or organic medium dispersion, adsorption, concentration and transport/magnetic separation, allowing chemical or electrochemical recovery of the compounds/materials adsorbed, regenerating the nanomaterial for later reuse. In this way it is possible their production and large-scale use.

In resume, the material, process of preparation and method for disposal of pollutants use minimal amounts of solvents and reagents, and make it possible to transform pollutants into high-value substances, by concentrating and recovery, and at the same time, promoting depollution and helping the conservation of the natural resources. For example, it enables the recovery of metals of high added value such as gold, silver, copper, etc., of wastewater contaminated with soluble salts of those elements. An additional advantage associated to the present invention is the no necessity of application of solvents in the separation process of the compound of interest or contaminant, which is most valued today for any industrial process due to the increasing concern towards the environment.

It is the aim of the present invention the process to obtain nanocomposite comprising the following steps:
addition of magnetite nanoparticles to a medium containing organic solvents;
addition of at least one adsorber substrate;
application of heating and/or reflux.

In a preferential aspect of the process of the present invention, the adsorber substrate consists of activated charcoal.

In a preferential aspect of the process of the present invention, the nanoparticles are added to the medium containing organic solvent so that the concentration of nanoparticles is of 1 to 30% (m/m), where the organic solvent is at least one selected from the group consisting of hexane, toluene, petroleum ether, cyclohexane, ethanol or a blend of them.

In a preferential aspect of the process of the present invention, the ratio between the magnetite nanoparticles and the adsorbent substrate is of 1:99 to 1:2 (m/m).

In a preferential aspect of the process of the present invention, the application of heating and/or reflux lasts from 10 to 120 minutes.

In a preferred performance, the process also comprises:
at least one step of stirring; and
at least one step of removal of the organic solvent.

It is also an objective of the present invention, a nanocomposite obtained by a process that comprises magnetic nanoparticles of $Fe_3O_4$ associated to a adsorbent substrate in which the adsorbent surface of nanoparticles and/or substrate adsorbent are independently modified with at least one selected from the group consisting of aliphatic carboxylates, olefinic, aromatic alkyl, silanes, phosphonates or a mixture of them.

In a preferred performance of the nanocomposite of the present invention, the surface of nanoparticles and/or substrate adsorbent are independently modified with at least one selected from the group consisting of nitric acid, selected fatty acids oleic acids, including lignoceric, behenic, cerotic, arachidic, stearic, palmitic, myristic, lauric, capric, caprylic, palmitoleic, myristoleic and linoleic, selected silanes among aryl and alkyl-silanes such as hexyl-silanes and dodecasilane or aryl and alkyl-phosphonates like dodecaphosphonate, aryl and alkyl-phosphates or a mixture of these substances.

In a preferred performance of the present invention, the nanocomposite is soluble in organic or inorganic liquid medium and is retrievable using a magnetic field.

It is also the objective of the present invention, a method for the capture and retrieval of solubilized and/or dispersed materials in organic or inorganic medium comprising the steps of:
associate the nanocomposite with a solubilized and/or dispersed recovering interest material in the medium;
separate the nanocomposite associated with the material of interest from the medium with the aid of a magnetic field; and
separate the material of interest from the nanocomposite, where the material of interest interacts more strongly with the surface of the nanoparticle and/or of the adsorbent substrate that is part of the nanocomposite than with the environment.

In a preferred performance, the method also comprises:
reuse the nanocomposite for at least once.

In a preferred performance of the method of the present invention, the solubilized and/or dispersed material of interest in the medium is at least one selected from the group consisting of metal composite, transition metal, metal ions, organic compound, dyestuff, pesticide, drug, hormone or a combination of them.

In a preferred performance, the method of the present invention, the solubilized and/or dispersed material in the medium is recovered until its concentration is reduced to parts per billion (mg/ton).

In a preferred performance, the method of the present invention, the step of associating the nanocomposite with a material of interest is done by adsorption.

In a preferred performance, the method of the present invention, the step of separating the nanocomposite associated with the material of interest from the medium is done using a magnet field.

In a preferred performance, the method of the present invention, the step of separating the material of interest from the nanocomposite is done by at least one of the desorption processes using organic solvents, acidic or alkaline solutions, or electrochemically induced regeneration or by reducing or oxidizing substances, or a combination of them.

In a preferred performance, the method produces metal concentrates and/or reusable organic substances.

It is also an object of the present invention, a method of purification of an organic or inorganic medium comprising the steps of:
associate the nanocomposite with the solubilized and/or dispersed material in the medium;
separate the nanocomposite from the medium associated with the material with the aid of a magnetic field;
Where the material interacts more strongly with the surface of the nanoparticle and/or adsorbent substrate that is part of the nanocomposite than with the environment.

It is also an object of the present invention, a kit for capturing and retrieving the solubilized and/or dispersed material in an organic or inorganic medium that comprises:
the nanocomposite;
at least a method for separating the nanocomposite associated with the material of interest from the organic or inorganic medium with the aid of a magnetic field; and
at least a method for separating the material of interest from the nanocomposite.

It is also object of the present invention, a kit of purification of an organic or inorganic medium comprising:

the nanocomposite and
at least a method for separating the nanocomposite associated with the material from the organic or inorganic medium with the aid of a magnetic field.

These and other objects of the invention will be immediately valued by the area experts and by the companies with interests in the segment, and will be described in enough detail for its reproduction as per follows.

BRIEF DESCRIPTION OF THE ILLUSTRATIONS

Figure 10:
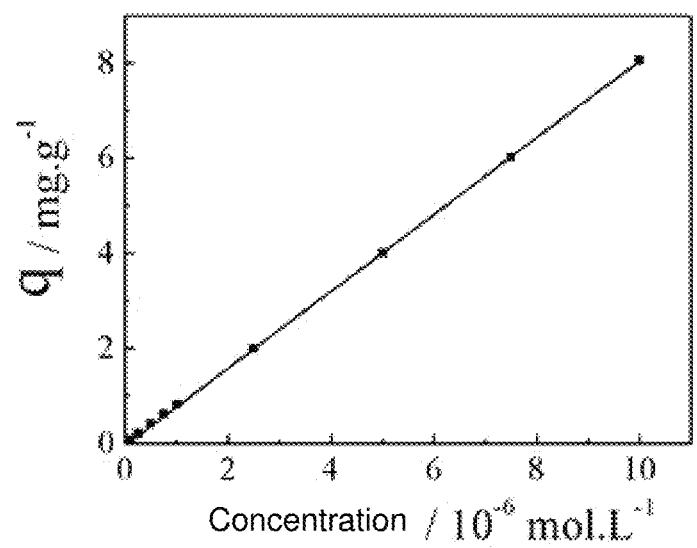
Figure 11:
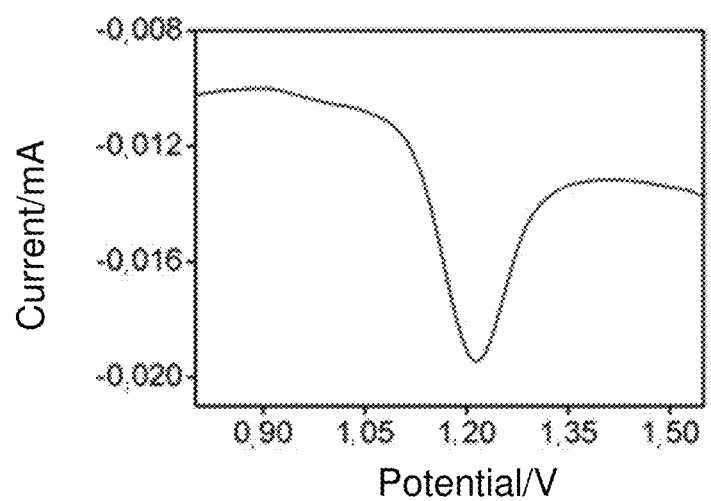

FIG. 10 shows the Hmag adsorption curve for □-Estradiol at concentrations ranging from 1, $0 \times 10^{-7}$ mol·L$^{-1}$ to, $0 \times 10^{-5}$ mol·L$^{-1}$ FIG. 11 shows the beta-stradiol square wave voltammogram in aqueous medium, in the presence of $H_2SO_4$ 0.05 mol·L$^{-1}$, using the following parameters: frequency=30 Hz, amplitude of 25 mV, E (step)=10 mV.

DETAILED DESCRIPTION OF THE INVENTION

The present invention can be described as a system that allows removing and/or recovering contaminants or organic/inorganic materials of interest from an inorganic or organic medium, preferably liquid medium, and more preferably aqueous medium using the treatment with a magnetic adsorbent nanomaterial subject to chemistry and/or electrochemistry regeneration.

The adsorbent nanocomposite interacts with the materials of interest for removal from liquid medium, just through a simple procedure of stirring and so the nanocomposite already associated with the material of interest can be magnetically removed from the solution in a quick and simple way, with the aid of a magnetic field (magnet or electromagnet), without the necessity of filters and other costly and time-consuming methods.

The magnetic adsorbent nanocomposite was prepared through the association of a solid phase (adsorbent substrate), as for example activated charcoal of large surface with super magnetic nanoparticles of lipophilic magnetite in non-polar solvent (liquid phase). The adsorbent substrate can be composed of high capacity activated charcoal (adsorbent) and nanoparticles consisting of magnetite nanocrystals ($Fe_3O_4$) with high saturation magnetization, super paramagnetic at temperatures above 100 K and at time of measurement in the range of seconds, chemically active with amphiphilic molecules, typically, aliphatic carboxylates, olefinic, aromatic alkyl, as for example: medium and log chain fatty acids ($C_7$ $C_{21}$), saturated and unsaturated oleic acids, preferably, lignoceric, benzoic, cerotic, arachidic, stearic, palmitic, myristic, lauric, capric, caprylic, palmitoleic, myristoleic, linoleic forming monolayers and containing between 100 and e 2000 molecules per particle from 4 to 10 nm in diameter.

The nanocomposite is prepared based on the association, according to the link between the activated charcoal and the nanoparticle. Usually, the charcoal is added to a dispersion of magnetite nanoparticles in hexane. The mixture is heated and maintained in reflux while stirring vigorously. So, the solvent is partially removed by distillation and, after cooling, ethanol is added and the material is magnetically separated. In some cases, the total removal of the solvent using vacuum can be more adequate.

Finally, the material is resuspended in ethanol under stirring and it is separated again, preferably with the aid of a magnet. The material washing/cleansing procedure is repeated 1 to 5 times, and finally the material is dried in an oven. Variations in this procedure, such as changes of solvents (toluene, petroleum ether, cyclohexane, hexane), as well as precipitating solvents (ethanol, acetone, THF, isopropyl alcohol), reflow temperature and time (preferably from 10 to 120 min), concentrations of nanoparticle dispersions (preferably from 1 to 30% m/m) were tested resulting in similar materials, but with the increasing of the magnetization. Nanocomposites with different percentages of charcoal and nanoparticles were prepared 99:1, 95:5, 90:10, 85:15, 80:20 and 70:30 m/m. Materials with similar adsorption properties but with magnetic properties compatible with magnetite were obtained.

The process of obtaining the nanocomposite and the method of impregnation in the activated charcoal were substantially modified and optimized for large-scale production. The nanocomposites were prepared using a new route more reproducible, leading to more pure products with distinct characteristics from the materials used previously. The nanocomposites was prepared using a new and simpler process based on impregnation followed by reflux and concentration, as well as the proportion of magnetite:charcoal has varied in a wide range (preferably of 1:99 to 1:2). The magnetization degree is proportional to the relative mass of magnetite nanoparticles.

The magnetic adsorbent nanocomposite can also be regenerated, e.g. by applying electrical current, allowing the transport of metal ions (contaminants) adsorbed on their binding sites, from the charcoal to the surface of the electrode, by diffusion, reducing them to their metallic form.

Several water-soluble materials can be recovered, e.g. metal, transition metal, metal ions, organic compounds, dyes, hormones or drugs. Additionally, materials can also be in low concentrations which make its removal difficult using the different methods of the present invention.

According to the present invention, the expression "low concentration" can be understood as a concentration where the conventional separation methods are not able to remove these compounds from a inorganic or organic medium such as concentrations of parts per million to parts per billion (micrograms per kilogram).

It's worth pointing out that the application of the present invention is not limited only to compounds in low concentrations. The medium to which it applies may have a relatively high concentration of a particular target compound and the nanocomposite will be able to remove it, according to its specific capacity. That is, the nanocomposites are capable to remove the pollutant from the medium with increasing efficiency, depending on the relative amount of the material used for such purpose.

Thereby, it is presented a method of capturing and recovering the solubilized and/or dispersed material in organic or inorganic medium according to the steps:
- associate the nanocomposite to a solubilized and/or dispersed recovering interest material in the medium;
- separate the nanocomposite associated to the material of interest from the medium with the aid of a magnetic field; and
- separate the material of interest from the nanocomposite, where the material of interest interacts more strongly with the surface of the nanoparticle and/or the adsorbent substrate that is part of the nanocomposite than with the environment.

Thereby, the present invention makes possible to obtain a concentrate of the contaminant on the electrode, in the form of a solid metal of high purity. The nanomaterial, being inert to the electrochemical process, is regenerated during the process, and can be reused for at least once in the cycle. Preferably being reused for at least 5 times. When the electrochemical process is not feasible (in the case of some organic contaminants), it is possible to regenerate the adsorbent through chemical treatment with alkaline or acidic solutions, or even using solvents which have greater compatibility with the adsorbed species (organic contaminants) than those by the modified charcoal. In both cases, it is possible to recover the adsorbent nanomaterial so its adsorption capacity remains high and approximately constant over the successive cycles of treatment.

Similarly, the present invention also enables the use of a purification method of an organic or inorganic medium comprising the steps of:
- associate the nanocomposite to solubilized and/or dispersed material in the medium and;
- separate the nanocomposite from the medium associated with the material with the aid of a magnetic field;
- where the material interacts more strongly with the surface of the nanoparticle and/or adsorbent substrate that is part of the nanocomposite than with the environment.

The nanocomposite associates, preferably by using adsorption, to the contaminant or solubilized and/or dispersed material of interest in the medium and then nanocomposite, already associated to the contaminant or the material of interest, is separated from the medium with the aid of a magnetic field. Since the nanocomposite presents in its composition magnetite nanoparticles, which have super paramagnetic properties, the nanocomposite can be easily separated from the medium with aid, for example, a magnet or electromagnet. Therefore, the present invention also allows the removal of contaminants from the medium, contributing to the achievement of an purer organic or inorganic medium and it can be applied, for example, to decontaminate aqueous medium.

So, the present invention applications involve the integration, adsorption or complexation of activated charcoal with the magnetic nanoparticles in order to obtain nanocomposites with adjusted properties for several applications. The activated charcoal can be the commercial activated charcoal or can be obtained through physical-chemical and/or thermo chemical treatments and the magnetic nanoparticles be magnetite with lipophilic or hydrophilic coating of nano-sized dimensions.

It is presented a kit for capturing and recovering solubilized and/or dispersed material in organic or inorganic medium according to the steps:
- the nanocomposite;
- at least one method for separating the nanocomposite associated with the material of interest from the medium with the aid of a magnetic field; and
- at least one method for separating the material of interest from the nanocomposite.

This kit allows the use of a capturing and recovering method of solubilized and/or dispersed material in organic or inorganic medium.

Additionally, it is presented the kit for purification of organic or inorganic medium comprising:
- the nanocomposite and
- at least a method for separating the nanocomposite associated with the material from the organic or inorganic medium with the aid of a magnetic field.

This kit allows the use of a purification method for solubilized and/or dispersed material in organic or inorganic medium.

The examples given below are intended only to illustrate one of the many ways to carry out the invention, without limiting the scope of it.

Example 1. Preferred Method

The magnetic adsorbent nanocomposite was prepared through the association of a solid phase, using activated charcoal of large surface area with a liquid phase the comprised the super magnetic nanoparticles of lipophilic magnetite in apolar solvent.

Activated charcoal (adsorbent) has high capacity of adsorption, with grain sizes between 4 to 100 mesh, preferably 100 mesh, and high surface area, preferably greater than 700 $m^2g^{-1}$ (BET).

The nanoparticles consist of nanocrystals of magnetite ($Fe_3O_4$) from 4 to 10 nm (whose sizes were evaluated by MET, SEM, XRD and magnetic susceptibilities measures), monomodal, with narrow distributions of size (10 to 20% RSD), high saturation magnetization (usually between 40 and 80 emu $g^{-1}$), super paramagnetic at temperatures above 100 K and in period of measurement in the range of seconds chemically activated with amphiphilic molecules, typically, medium and long chain fatty acids ($C_7$ $C_{21}$), saturated and unsaturated oleic acids, preferably, I lignoceric, benzoic, cerotic, arachidic, stearic, palmitic, myristic, lauric, capric, caprylic, palmitoleic, myristoleic, linoleic, forming monolayer containing usually between 100 to 2000 molecules per particle from 4 to 10 nm (elemental analysis, TGA, titration, MEV, MET, DLS).

The nanocomposite is prepared based on the association, according to the affinity between the activated charcoal and the nanoparticle. Typically, 90 g of charcoal is added to a dispersion of 10 g of magnetite nanoparticles in 250 mL of hexane. The mixture is heated and maintained in reflux during 30 minutes while stirring vigorously. The solvent is partially removed through distillation until half the volume remains. After cooling, 100 g of ethanol is added and the material is magnetically separated. In some cases, the total removal of the solvent using vacuum is more adequate. Finally, the material is resuspended in 50 g of ethanol under stirring and it is separated again, preferably with the aid of a magnet. The material washing/cleansing procedure is repeated 1 to 5 times. Finally the material is dried in an oven at 100° C. for 6 hours. Variations in this procedure, such as changes of solvents (toluene, petroleum ether, cyclohexane, hexane), as well as precipitating solvents (ethanol, acetone, THF, isopropyl alcohol), reflow temperature and time (preferably from 10 to 120 min), concentrations of nanoparticle dispersions (preferably from 1 to 30% m/m) were tested resulting in similar materials, but with the increasing of the magnetization. Nanocomposites with different percentages of charcoal and nanoparticles were prepared: 99:1, 95:5, 90:10, 85:15, 80:20 and 70:30 m/m. Materials with similar adsorption properties but with magnetic properties compatible with the magnetite percentage were obtained.

The material obtained with activated charcoal containing 10% in mass of magnetic nanoparticles with 5 nm in diameter presented surface area of 600 $m^2 g^{-1}$ average pore size of 1.6 nm, average pore volume equal to 0.473 cc/g, and minimum adsorption capacity of methylene blue of 200 mg/g of the nanocomposite.

Figure 1:
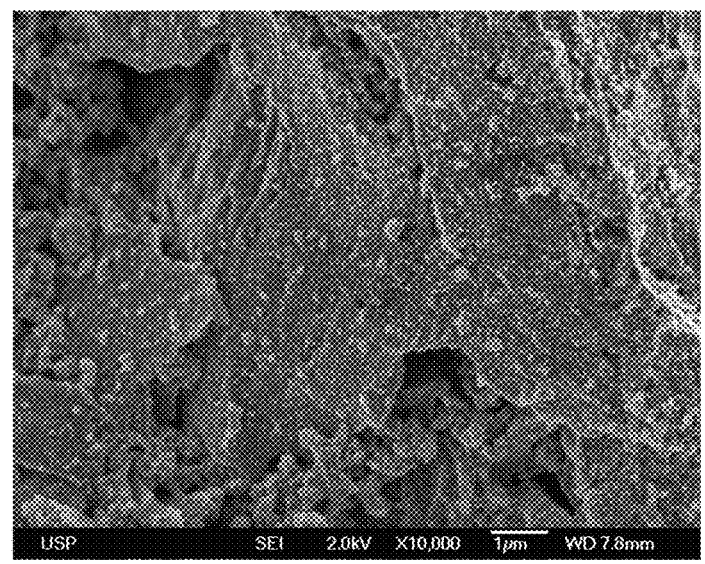
FIG. 1 shows a scanning electronic microscopy of the modified charcoal through the nanoparticles integration.

FIG. 1 has the scanning electron microscopy (MEV) of a magnetic adsorbent nanomaterial in 10,000× magnification, demonstrating the presence of $Fe_3O_4$ nanoparticles on its surface.

The adsorbent nanomaterial interacts with the materials of interest for removal from liquid medium, just through a simple procedure of stirring and so it can be magnetically removed from the solution quickly and simply with the aid of a magnetic field (magnet or electromagnet), without the necessity of filters and other costly and time-consuming methods.

Adsorbents tested included:
super paramagnetic magnetite nanoparticles with its surface modified with silane groups containing sulfhydryl functions (NpS);
super paramagnetic magnetite nanoparticles with its surface modified with silane groups containing amina functions (NpA);
activated charcoal+magnetite nanoparticles (Cmag); and
activated charcoal modifying chemically more magnetite nanoparticles (Hmag).

The activated charcoal used in the preparation of Hmag underwent surface treatment process with concentrated nitric acid while stirring and boil during 1 hour, followed by washing with distilled water until the total absence of nitrate in the wash water.

Magnetite nanoparticles modified with silane groups containing sulfhydryl functions (NpS) and the magnetite nanoparticles modified with silane groups containing amine functions (NpA) were used in the tests for comparison with the activity of the nanocomposites, but eventually, these modified nanoparticles can also be aggregated to the activated charcoal according to the process defined in the present invention to generate other examples of nanocomposites with hydrophilic nanoparticles.

Mercury Adsorption Assay (II) in Samples of Oil Wastewater

Three samples of liquid effluent from the oil industry, named TQ, PS and PF were used.

Objective: Remove the dissolved mercury from the effluent samples of the oil industry.

Samples Characteristics

Samples with high content of aliphatic, aromatic compounds, metal cations and precipitated material;

Color yellowish:
Strong smell.

TABLE 1

| | SAMPLE | | |
|---|---|---|---|
| | TQ | PS | PF |
| Elements detected in the solution (EDX) after treatment | S | S (67%), Ca (33%) | S (73%), Ca (18%), Fe (9%) |
| Elements detected in the Cmag adsorbent (EDX) | S, Ca, Fe, V, Mn, Zn, Sr, P, Te, Ba, Ni, Cr | S, Ca, Fe, V, Zn, Sr, P, Pd, Te, Ba, Cr | S, Fe, V, Cu, As, Br, Rb, P, Ca, Ti |

Table 1 presents an elemental analysis of samples received using X-ray fluorescence by dispersive energy, both in the liquid samples as well as in the contaminants retained in the Cmag adsorbent after treatment, during 1 hour with stirring up to 200 rpm, 40 mL of solution, 1 g/L of adsorbent, and temperature of 25° c.

The concentration in which mercury is dissolved in these samples is not detectable in the EDX even performing a pre-concentration step in the adsorbent materials used. Due to this fact, it was used the atomic absorption spectrometry analysis (AAS) under cold steam.

Figure 2:
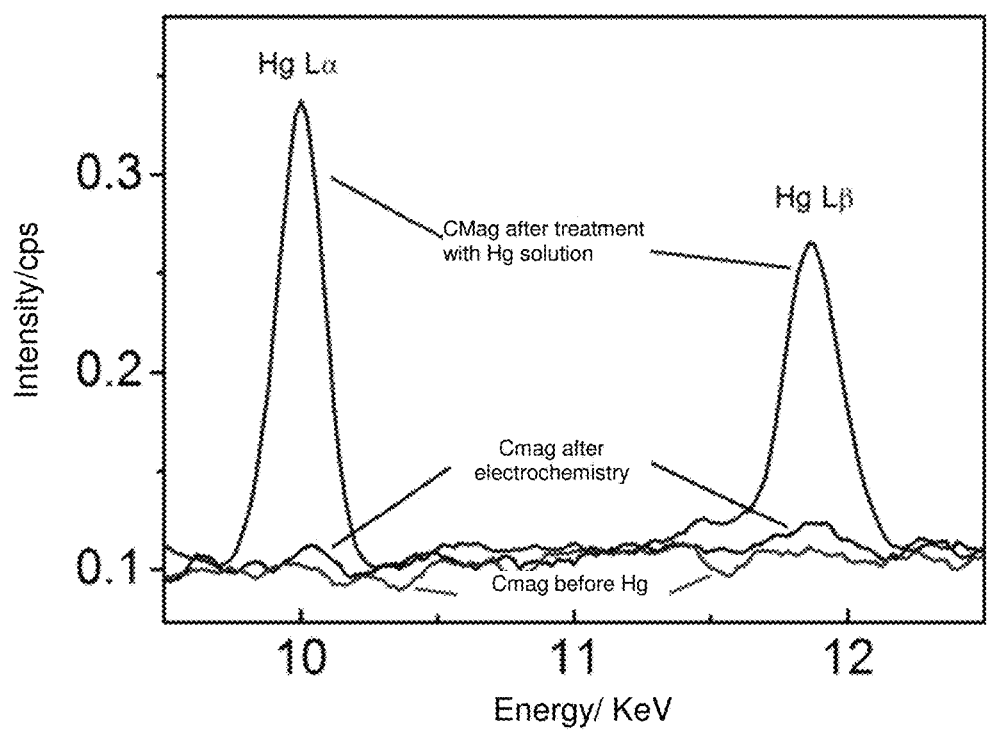
FIG. 2 shows the occurrence of the Hg X-ray fluorescence in the adsorbent material and the complete removal of metal associated to the nanocomposite after the first electrochemical treatment.
Figure 3:
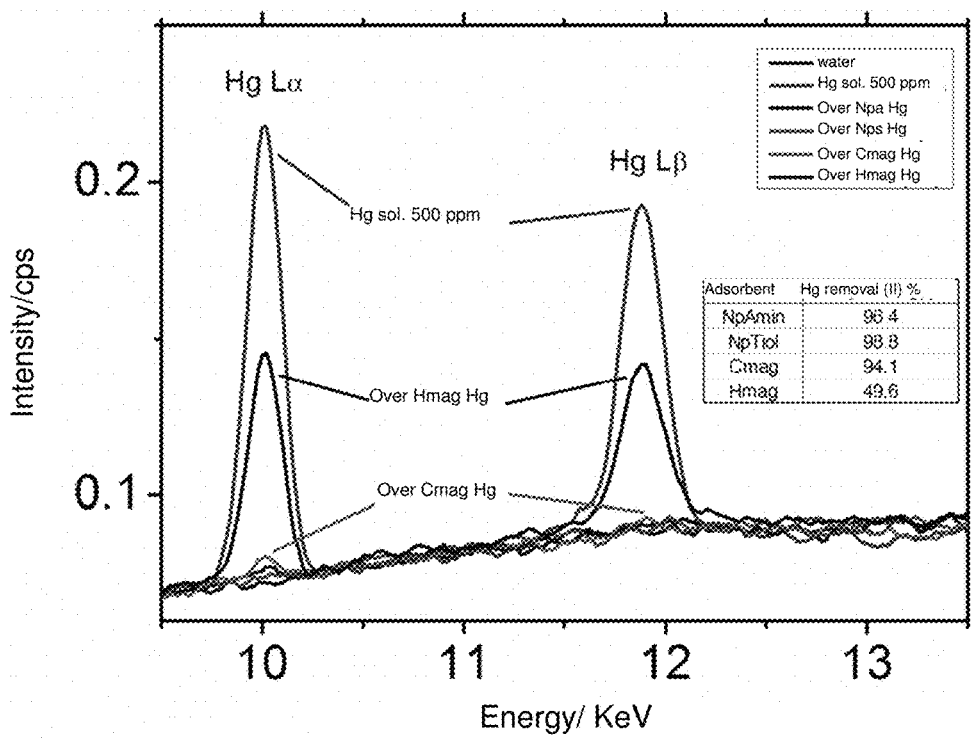
FIG. 3 shows the comparison between the adsorbent materials upon removal of Hg (II), 10 mg/L solution, by monitoring the X-ray band fluorescence using the dispersive energy from the aqueous solutions before and after the treatments.

The initial strategy was to find out what would be the best performance adsorbent for mercury removal using aqueous solutions prepared from mercury (II) chloride at a concentration of 10 mg/L, 25° C. for one hour of adsorption, as noted in FIGS. 2 and 3. Then, several treatments were performed with the samples received, as per summarized in tables 2 and 3.

Figure 4:
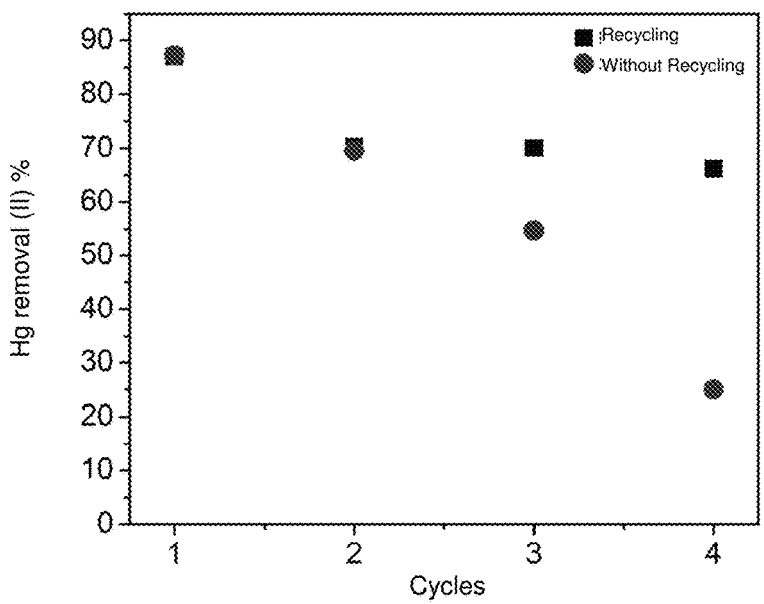
FIG. 4 shows the activity of nanocomposite recovered over 4 cycles of electrolysis measured by the percentage of the Hg removed.
Figure 5:
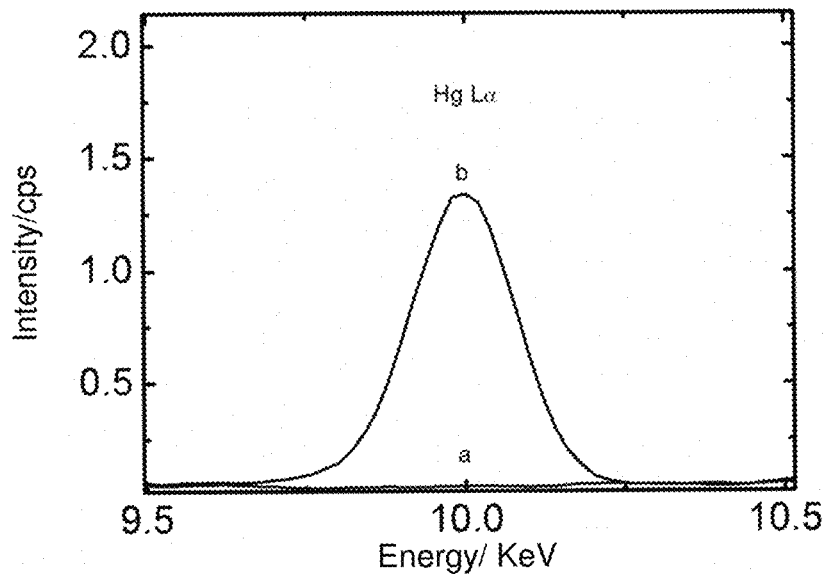
FIG. 5 shows the X-ray fluorescence spectra that explain the electrode surface coating with metallic mercury after 4 cycles of electrolysis (b).

At the same time, it was performed the study of recycling the adsorbent material using electrolysis after the pre-concentration with solutions of mercury (II) chloride in the range of "parts per million" ($mg \cdot L^{-1}$), as shown in FIGS. 4 and 5. Table 2 below shows the physiochemical and atomic absorption spectrometry analysis under cold vapor of the samples.

TABLE 2

| | SAMPLE | | |
|---|---|---|---|
| | TQ | PS | PF |
| pH | 10 | 10 | 3 |
| * Hg (II) dissolved (initial) (µg/L) | 256 | 382 | 236 |
| *After treat a (µg/L) | 59 | 33 | 0 |
| *After treat b (µg/L) | Not performed | Not performed | 110 |
| *After treat c (µg/L) | Not performed | Not performed | 56 |
| *After treat d (µg/L) | 35 | Not performed | 6 |

Table 3 below shows the characteristics of the treatments performed in the samples and the percentage of the dissolved mercury removal. The assays were carried out in 50-mL glass tubes with screw cap, stirring up to 200 rpms in a orbital shaker table equipped with thermostat up to 25° C.

TABLE 3

| TREATMENT-Sample | Removal of Hg | STEP | | |
|---|---|---|---|---|
| a-PF | 100% | 1 hour ads 80 mg NpHS | 1 hour ads 80 mg NpHS | 1 hour ads 80 mg Cmag |
| b-PF | 53% | 1 h ads 10 mg Cmag | — | . |
| c-PF | 76% | 1 h ads 20 mg Cmag | — | — |
| d-PF | 98% | 1 h ads 400 mg Cmag | — | — |
| a-TQ | 77% | 1 hour ads 80 mg NpHS | 1 hour ads 80 mg NpHS | 1 hour ads 80 mg Cmag |
| d-TQ | 86% | 1 h ads 400 mg Cmag | — | — |

The assays showed that is possible to use Cmag adsorbent material with effectiveness in removing dissolved mercury and reuse it after the electrolysis cycles, with a lower cost than the other similar nanomaterials. It is possible to increase the efficiency and speed of the process using proportional higher quantities of this material, justified by its reuse in another step in the process, including separating the metallic mercury from the effluent.

Study of the Feasibility of Using Magnetic Charcoal for Removal of Organic Compounds Many contaminants present in watersheds and water samples of environment interest do not belong only to the group of heavy metals, but to the group of organic compounds (solvents, dyes, pesticides, hormones, etc.). To verify the possibility of application of magnetic charcoal in procedures of environmental recuperation for these compounds, an experiment was conducted to test the adsorption of nitrobenzene in aqueous solutions with neutral pH, using magnetic charcoal (Cmag).

Figure 6:
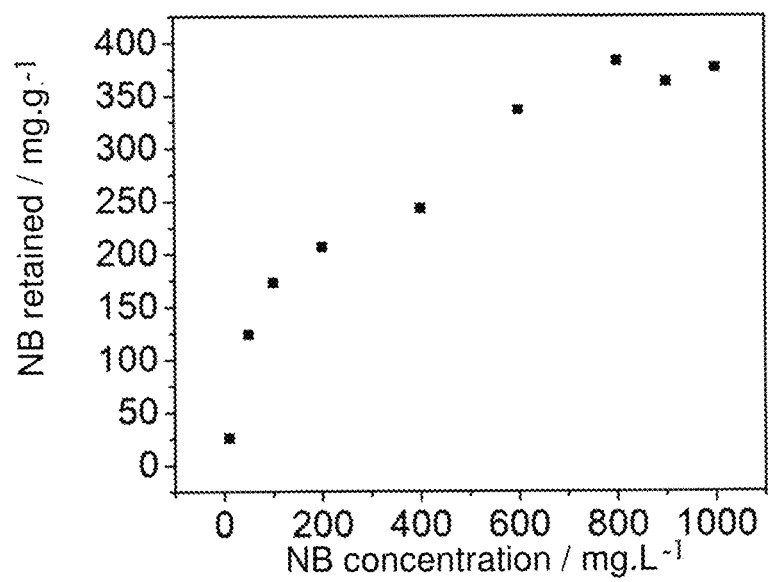
FIG. 6 shows the isotherm adsorption of nitrobenzene in water using Cmag.

Nitrobenzene is an poisonous organic compound with smell of almonds used in laboratories as solvent and in the industry for aniline production. In this procedure, 30 mL of nitrobenzene solution of several concentrations between 50 $mg \cdot L^{-1}$ to 900 $mg \cdot L^{-1}$ were treated with 10 mg of Cmag, during one hour under stirring at the shaker table equipped with a thermostat up to 25° C. After the treatment, the magnetic separation of Cmag was carried out and the amount of nitrobenzene remaining in the solution was monitored spectrophotometrically within a band of 267 nm, due to the presence of the nitrobenzene molecule in water. The results of this first analysis can be viewed in FIG. 6, showing the adsorption isotherm for the charcoal used (Cmag).

Under this method, it was found that the magnetic charcoal can be used for removing nitrobenzene from water, thus obtaining a maximum amount of retention of 450 mg of nitrobenzene adsorbed per gram of Cmag, quickly and without the need of filtration steps or extraction using organic solvents, which a large number of current methods depend on. Avoid the use of solvents in the industrial processes is something very valued today due to recent increases towards environment concerns.

Study of Application of Magnetic Charcoal for Removing Pararosaniline Dye (Gentian Violet) from Water The presence of organic dyes in liquid effluents from the industry of pigments, weaving, paper among others, represents a serious risk to the environment, besides the costly steps of the water treatment process. Were conducted experiments in order to test the removal of pararosaniline in aqueous solutions, at concentrations ranging from 0.05 to 5 mg/L, in several pHs using magnetic charcoal (Cmag).

Figure 7:
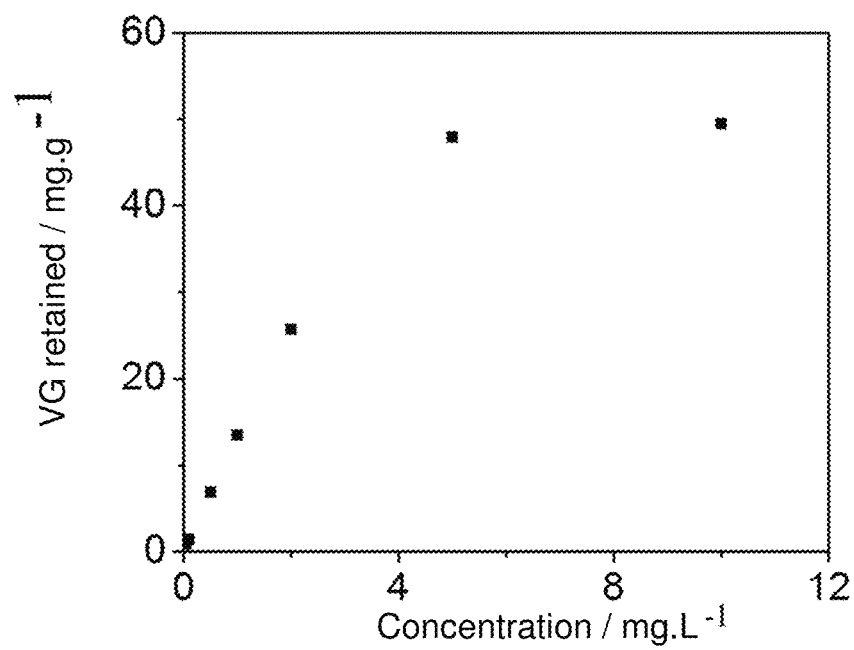
FIG. 7 shows the isotherm adsorption of pararosaniline dye in water using Cmag.

Adsorption essays were performed on a shaker equipped with thermostat at 25° C. during 1 hour. The amount of the Cmag used was 5 mg and the amount of dye solution VG (pararosaniline $C_{19}H_{19}N_3$ article 7601 MERCK, PM: 305.38 g/mol) was 80 mL. The dye solutions were prepared from a stock solution of 10 $mg \cdot L^{-1}$ in a range from 0.05 $mg \cdot L^{-1}$ to 5 $mg \cdot L^{-1}$. The solutions were analyzed by UV-Vis spectrophotometry, monitoring the absorption band at 548 nm, in relation to the presence of pararosaniline. The vials containing the solutions once pink became apparently colorless and the quantity of VG dye remaining was measured and used in the construction of the adsorption isotherm, as per noted in FIG. 7.

From the data obtained was possible to estimate the adsorption capacity of the Cmag for removing dyestuff in aqueous solution under the essay conditions as being removal of 52 mg of VG per gram of Cmag, and essay conditions of 25° C., time described in Table 3 and stirring at 200 RPM in an orbital shaker table equipped with thermostat up to 25° C.

The Cmag recycling was tested after the dye removal process where adsorbent was separated from the solution with the use of a magneto, being the liquid removed and the ethanol added to the vial containing the Cmag. The VG dye once adsorbed on the Cmag was recovered through the addition of a small amount of ethanol to the Cmag containing the dye, as per noted by the reappearance of a rosy coloring of the solution, confirmed by the presence of the electronic band characteristic of the dye and regenerating the Cmag for later use.

Therefore it was concluded that this material is able of removing the pararosaniline dye from aqueous solutions and has the potential for removing other classes of organic compounds in an efficient, quick manner and the adsorbent material can be recycled with the use of suitable solvents.

Study of Application of Magnetic Charcoal for Removal and Analysis of □-Estradiol from Water Another possibility explored was the use of the Hmag sample for removing □-estradiol from water. □-estradiol is a hormone present in the cities water supplies and can be associated with several harmful conditions, as previously commented. The scarcity of water treatment methods efficient for removing hormones causes this compound be an environmental problem of scientific interest.

The proposed methodology is the use of magnetic charcoal to remove by adsorption, via □ interactions, the compound from the water and apply the material magnetic properties to achieve its separation from the sample and, if desire, proceed to the electrochemical monitoring of such removal.

In order to check the efficiency of removal of □-estradiol after the treatment of the solutions using Hmag, it was used the electronic spectroscopy, evaluating the band around 270 nm.

Initially, the pH of maximum efficiency was tested to perform the □-estradiol-adsorption using the HMag; for this experiment, it was prepared 500 mL of aqueous solution 1.0×10$^{-8}$ mol·L$^{-1}$ of □-estradiol. The solution was fractionally in 50 mL portions and each one had its pH adjusted. The pH adjustment was carried out between values from 2 to 14. Each sample was then treated with 8 mg of Hmag, while stirring, during 10 minutes. After treatment, the charcoal has been removed magnetically. After that, a supernatant analysis was performed to check the remaining amount of hormone in the water. The analysis was carried out spectrophotometrically, following the absorption band around 270 nm, as previously commented.

Figure 8:
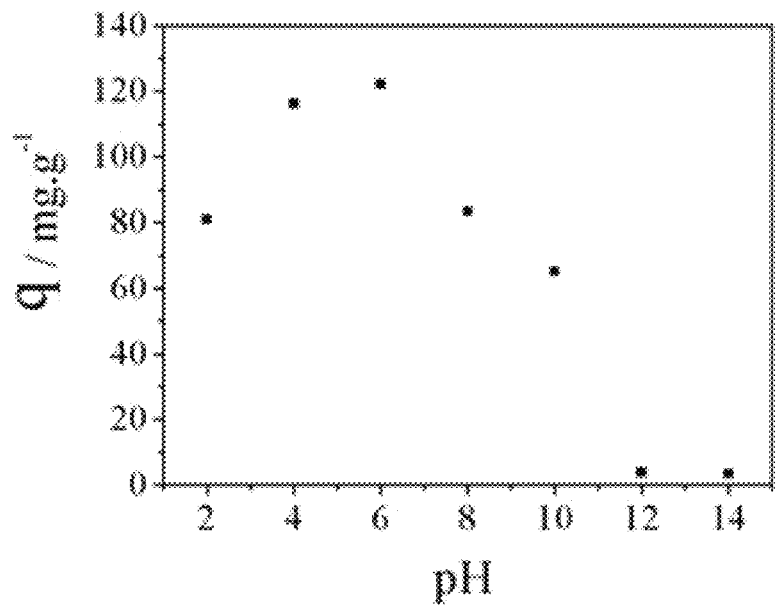
FIG. 8 shows the efficiency of the adsorption process of □-Estradiol due to the solution pH.

The results, as per FIG. 8, show that the pH where the adsorption process has increased efficiency is around 6.0, possibly because the hormone protonation is total in this pH value (pKa=10.71). So, this was the pH value used in the subsequent trials.

Figure 9:
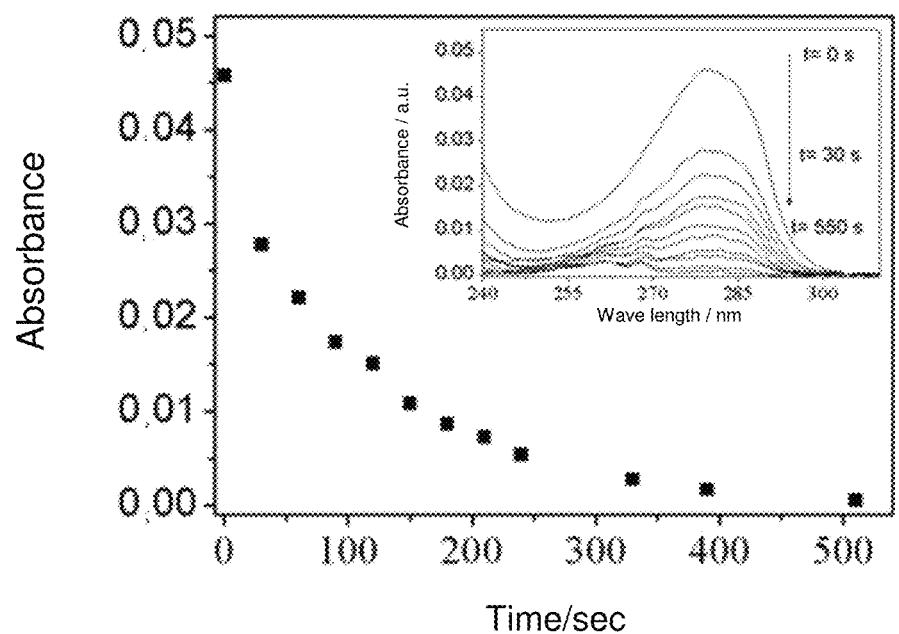
FIG. 9 shows the variation in the concentration of □-Estradiol according to the period of treatment with Hmag by monitoring the electronic spectrum of the supernatant solution.

The following study consisted of a kinetic study of adsorption. This study was conducted by monitoring the band in approximately 270 nm depending on the time of HMag treatment. A portion of 50 mL of the □-estradiol solution in water ($1.0 \times 10^{-8}$ mol·L$^{-1}$) prepared in the earlier study had the pH adjusted to 6.0; the sample was treated with 8 mg of HMag; periodically, aliquots of solution were removed and analyzed. The results are in FIG. 9, where you can see clearly that almost all □-estradiol (within the limit of spectrophotometric detection) is removed from the solution after about 300 seconds. The adsorption kinetics curve has a hyperbolic, reasonable behavior with the model of pseudo-first order. Therefore, the synthesized material has a high efficiency in removing the hormone from aqueous solutions and provides an alternative to environmental recuperation and water treatment for human consumption.

After the determination of the optimum conditions for analysis, the linearity of the method was verified in the case of solutions of varied concentrations of □-estradiol with 8 mg of HMag. This study is important to verify that the tests used to study the phenomenon of adsorption are indeed a good indicative of the remaining concentration of the hormone in the water after treatment with magnetic charcoal.

The chart obtained by plotting the remaining amount of the hormone in various solutions after treatment for 400 seconds at pH 6.0 with 8 mg of HMag is in FIG. 10. By linear regression, the value $R^2=0.997$ was found. This result shows that the remaining mass in the solution, after treatment with HMag, has a linear dependency on the initial concentration of the hormone, provided that the conditions of treatment are identical. This observation is usually a good background to suggest high affinity between the material in solution and the adsorbent used in its removal.

A preliminary electrochemical study, based on a published work in literature (*SALCI, BIRYOL,* 2002), was conducted with □-estradiol. This experiment revealed the possibility of electrochemical detection of this compound by means of the voltimetric peak around 1.22 V according to the voltammogram presented by FIG. 11.

The importance of electrochemical analysis feasibility of the hormone adsorbed in HMag rests in the monitoring of the removal of this compound in water treatment systems.

Those versed in the art will value the knowledge presented here and will be able to reproduce the invention in the presented modes and in other variants, covered in the scope of the attached claims.

The invention claimed is:

1. Nanocomposite, characterized by being obtained by a process comprising the following steps:
    adding magnetite nanoparticles to a medium containing organic solvents;
    adding at least one adsorbent substrate; and
    applying heating and/or reflux,
    the nanocomposite comprising $Fe_3O_4$ magnetic nanoparticles associated with an adsorbent substrate in which the adsorbent substrate surfaces, and optionally the nanoparticles surfaces, are independently modified with at least one selected from the group consisting of aliphatic carboxylic acids, olefinic compounds, alkyl-aromatics, silanes, phosphonates, and phosphates,
    wherein the adsorbent substrate is activated charcoal, and
    wherein the nanoparticles have a high saturation magnetization of between 40 and 80 emu/g.

2. Nanocomposite, according to claim 1, characterized by the independent modification of nanoparticles and/or the adsorbent substrate with at least one selected from the group consisting of oleic acid, lignoceric acid, behenic acid, cerotic acid, arachidic acid, stearic acid, palmitic acid, myristic acid, lauric acid, capric acid, caprylic acid, palmitoleic acid, myristoleic acid, linoleic acid, aryl-silanes, alkyl-silanes, aryl-phosphonates, alkyl-phosphonates, aryl-phosphates, and alkyl-phosphates.

3. Nanocomposite, according to claim 1, characterized by the ability to be dispersible in organic or inorganic liquid medium and recoverable by applying a magnetic field.

* * * * *